United States Patent
Pell et al.

(10) Patent No.: US 8,209,321 B2
(45) Date of Patent: Jun. 26, 2012

(54) EMPHASIZING SEARCH RESULTS ACCORDING TO CONCEPTUAL MEANING

(75) Inventors: Barney Pell, San Francisco, CA (US); Scott Prevost, San Francisco, CA (US); Giovanni Lorenzo Thione, San Francisco, CA (US); Brendan O'Connor, San Francisco, CA (US); Lukas Biewald, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 12/201,504

(22) Filed: Aug. 29, 2008

(65) Prior Publication Data

US 2009/0063472 A1    Mar. 5, 2009

Related U.S. Application Data

(60) Provisional application No. 60/969,478, filed on Aug. 31, 2007, provisional application No. 60/969,486, filed on Aug. 31, 2007.

(51) Int. Cl.
*G06F 7/00* (2006.01)

(52) U.S. Cl. ........ 707/713; 707/705; 707/731; 707/739; 707/729; 715/202

(58) Field of Classification Search ............... 707/755, 707/760, 763, 769, 713, 705, 729, 731
See application file for complete search history.

(56) References Cited

U.S. PATENT DOCUMENTS

| | | | |
|---|---|---|---|
| 5,519,608 A | 5/1996 | Kupiec | |
| 5,696,962 A | 12/1997 | Kupiec | |
| 6,189,002 B1 | 2/2001 | Roitblat | |
| 6,741,981 B2 | 5/2004 | McGreevy | |
| 6,968,332 B1 | 11/2005 | Milic-Frayling | |
| 7,401,077 B2 | 7/2008 | Bobrow | |
| 2002/0091684 A1* | 7/2002 | Nomiyama et al. | 707/3 |

(Continued)

FOREIGN PATENT DOCUMENTS

EP    0597630    5/1994

OTHER PUBLICATIONS

Final Office Action, mailed Jun. 22, 2011 in U.S. Appl. No. 12/201,596, 23 pages.

(Continued)

*Primary Examiner* — Wilson Lee
*Assistant Examiner* — Tuan-Khanh Phan
(74) *Attorney, Agent, or Firm* — Shook Hardy & Bacon LLP

(57) ABSTRACT

Computer-readable media, computerized methods, and computer systems for conducting semantic processes to present search results that include highlighted regions which are relevant to a conceptual meaning of a query are provided. Initially, content of document(s) is accessed and semantic representations are derived by distilling linguistic representations from the content. These semantic representations may be stored at a semantic index. Also, a proposition is derived from the query by parsing search terms of the query, and distilling the proposition from the search terms. Typically, the proposition is a logical representation of the conceptual meaning of the query. The proposition is compared against the semantic representations at the semantic index to identify a matching set. Regions of the content within the document, from which the matching set of semantic representations are derived, are targeted. Accordingly, highlighting may be applied to the targeted regions when presenting or displaying the search results.

20 Claims, 7 Drawing Sheets

U.S. PATENT DOCUMENTS

| | | | |
|---|---|---|---|
| 2004/0103090 A1* | 5/2004 | Dogl et al. | 707/3 |
| 2004/0249795 A1 | 12/2004 | Brockway | |
| 2006/0156222 A1 | 7/2006 | Chi | |
| 2006/0161534 A1 | 7/2006 | Carson, Jr. | |
| 2006/0224582 A1 | 10/2006 | Hogue | |
| 2006/0271353 A1* | 11/2006 | Berkan et al. | 704/9 |
| 2008/0120279 A1 | 5/2008 | Xue | |
| 2010/0106706 A1 | 4/2010 | Rorex | |

OTHER PUBLICATIONS

Final Office Action, mailed Jun. 7, 2011 in U.S. Appl. No. 12/201,978, 23 pages.

A Semantic Search Engine for Learning Resources http://www.formatex.org/micte2005/349.pdf., 2005.

Learning Ontology-based User Profiles: A Semantic Approach to Personalized Web Search http://citeseerx.ist.psu.edu/viewdoc/download;jsessionid=5A640DEA3FBD0948587330F6465D5B-4F?doi=10.1.1.74.7464&rep=rep1&type=pdf., Nov. 2007.

Hakia—Meaning-based Search Engine for a Better Search http://www.techiequest.com/hakia-meaning-based-search-engine-for-a-better-search., Aug. 28, 2008.

Semantic Search Methods http://microsoft.apress.com/asptodayarchive/73985/semantic-search-methods., Aug. 28, 2008.

Semantic Highlighting on the WWW: Educational Implications. http://eric.ed.gov/ERICDocs/data/ericdocs2sql/content_storage_01/0000019b/80/17/5a/e3.pdf., Nov. 1998.

Intellevate Prior Art Search Report, Aug. 27, 2008.

U.S. Appl. No. 60/969,406, filed Aug. 31, 2007, Applying Term Occurrence Constraints in Natural Language Search.

U.S. Appl. No. 60/969,442, filed Aug. 31, 2007, Valence Calculus for Indexing with Special Reference to Reported Speech and Thought.

U.S. Appl. No. 60/969,447, filed Aug. 31, 2007, Bucketized Threshold for Runtime Ranking and Pruning of Senses.

U.S. Appl. No. 60/969,451, filed Aug. 31, 2007, Hierarchal Probability-Based Weighting for Hypernyms in Word Sense Disambiguation.

U.S. Appl. No. 60/969,417, filed Aug. 31, 2007, Checkpointing of Composable Lazily-Evaluated Iterators in Search.

U.S. Appl. No. 60/969,472, filed Aug. 31, 2007, Semi-Automatic Example-Based Induction of Semantic Translation Rules to Support Natural Language Search.

U.S. Appl. No. 60/969,426, filed Aug. 31, 2007, Indexing of Alias Clusters for Search.

U.S. Appl. No. 60/969,495, filed Aug. 31, 2007, Efficient Posting Layout for Retrieval of Terms in Dominance Hierarchies.

U.S. Appl. No. 60/969,434, filed Aug. 31, 2007, Aboutness Identification and Indexing.

U.S. Appl. No. 60/969,478, filed Aug. 31, 2007, Semantically-based Highlighting of Search Results.

U.S. Appl. No. 60/969,486, filed Aug. 31, 2007, Fact-based Indexing for Natural Language Search.

U.S. Appl. No. 60/969,490, filed Aug. 31, 2007, Indexing and Ranking Role Hierarchies Search Index.

U.S. Appl. No. 60/971,061, filed Sep. 10, 2007, A System for Browsing Knowledge on the Basis of Semantic Relations.

U.S. Appl. No. 60/969,483, filed Aug. 31, 2007, Integration of Coreference Resolution in an Ambiguity-Sensitive Natural Language Processing Pipeline for a Search Platform.

European Search Report dated Sep. 23, 2011 in Application No. 08799054.5-2201/2185999, 7 pages.

Non Final Office Action in US Appl. No. 12/201,978, mailed Jan. 4, 2012, 21 pages.

* cited by examiner

| ARTICLES |
|---|

WHO CRITICIZED OBAMA    SEARCH

ARTICLES: RESULTS 1 – 10 OF 930    430

▸ BARACK OBAMA PRESIDENTIAL PRIMARY CAMPAIGN, 2008 :CLINTON::CRITICIZED::OBAMA: FOR VOTING "PRESENT" ON MANY OCCASIONS WHILE IN THE ILLINOIS LEGISLATURE. — 425 / 435

▸ BARACK OBAMA DEMOCRATIC PARTY PRIMARY PRESIDENTIAL CAMPAIGN, 2008 :CLINTON: :CRITICIZED::OBAMA: FOR VOTING "PRESENT" ON MANY OCCASIONS WHILE IN THE ILLINOIS LEGISLATURE.

▸ HILLARY CLINTON PRESIDENTIAL CAMPAIGN, 2008 :CLINTON::CRITICIZED::OBAMA: FOR VOTING "PRESENT" ON MANY OCCASIONS WHILE IN THE ILLINOIS SENATE.

▸ HILLARY RODHAM CLINTON PRESIDENTIAL CAMPAIGN, 2008 CI 445 :CRITICIZED: :OBAMA: FOR VOTING "PRESENT" ON MAN' SIONS WHILE IN THE ILLINOIS SENATE. — 440 / 455

▸ JEREMIAH WRIGHT CONTROVERSY :CONSERVATIVE::AUTHOR::AND::COLUMNIST::ANN: :COULTER::HEAVILY::CRITICIZED::OBAMA: FOR WHAT SHE CALLED "WAITING TOO LONG" TO CONDEMN PASTOR WRIGHT HIMSELF.   450

PREV  1  2  3  4  5  6  7  8  MORE

EXPLORE THE FOLLOWING PAGES ON POWERSET:

BARACK OBAMA PRESIDENTIAL PRIMARY CAMPAIGN, 2008, BARACK OBAMA DEMOCRATIC PARTY PRIMARY PRESIDENTIAL CAMPAIGN, 2008, HILLARY CLINTON PRESIDENTIAL CAMPAIGN, 2008, HILLARY RODHAM CLINTON PRESIDENTIAL CAMPAIGN, 2008, JEREMIAH WRIGHT CONTROVERSY, MICHELLE OBAMA, BILL AYERS ELECTION CONTROVERSY, POLITICAL POSITIONS OF BARACK OBAMA, UNITED STATES PRESIDENTIAL ELECTION, 2008 TIMELINE, A MORE PERFECT UNION (BARACK OBAMA SPEECH)

*FIG. 4.*

ARTICLES

WHO DID OBAMA CRITICIZE    SEARCH

ARTICLES: RESULTS 1 – 10 OF 933

▸ BARACK OBAMA AFTER WRIGHT REITERATED SOME OF HIS REMARKS IN A SPEECH AT THE NATIONAL PRESS CLUB, :OBAMA: :STRONGLY: :DENOUNCED: :WRIGHT:, WHO HE SAID "[PRESENTED] A WORLD VIEW THAT CONTRADICTS WHO I AM AND WHAT I STAND FOR."

▸ POLITICAL POSITIONS OF BARACK OBAMA ON MARCH 20, 2008, :OBAMA: :CRITICIZED: :HIS: :RIVALS: FOR UNDERMINING AMERICA'S SECURITY: "BECAUSE OF THE BUSH-MCCAIN POLICIES, OUR DEBT HAS BALLOONED.

▸ MICHELLE OBAMA IN A PRESS ACCOUNT OF HER SARCASM, THE NEW YORK TIMES OP-ED COLUMNIST MAUREEN DOWD SAID: "I WINCE A BIT WHEN :MICHELLE: :OBAMA: :CHIDES: :HER: :HUSBAND: AS A MERE MORTAL — COMIC ROUTINE THAT RESTS ON THE PRESUMPTION THAT WE SEE HIM AS A GOD ...

▸ A MORE PERFECT UNION (BARACK OBAMA SPEECH) WHILE :HE: :DECRIED: THE REMARKS MADE BY WRIGHT, HUCKABEE, A FORMER PASTOR HIMSELF, ALSO NOTED THAT "SERMONS...ARE RARELY WRITTEN WORD-FOR-WORD" AND THAT PASTORS OFTEN GET "CAUGHT UP IN THE EMOTION OF THE MOMENT." ... WHAT THE ANALYSTS WHO ARE GUSHING OVER :OBAMA: :'S SENTIMENTS REGARDING RACE RELATIONS ARE MISSING IS NOT ONLY DID :OBAMA: FAIL TO ACCOMPLISH THE MISSION HE NEEDED TO, HE DIDN'T EVEN REALLY TRY.

PREV  1  2  3  4  5  6  7  8  MORE

EXPLORE THE FOLLOWING PAGES ON POWERSET:

BARACK OBAMA, POLITICAL POSITIONS OF BARACK OBAMA, MICHELLE OBAMA, A MORE PERFECT UNION (BARACK OBAMA SPEECH), BARACK OBAMA PRESIDENTIAL PRIMARY CAMPAIGN, 2008, A MORE PERFECT UNION (SPEECH), HILLARY CLINTON PRESIDENTIAL CAMPAIGN, 2008, HILLARY RODHAM CLINTON PRESIDENTIAL CAMPAIGN, 2008, BARACK OBAMA DEMOCRATIC PARTY PRIMARY PRESIDENTIAL CAMPAIGN, 2008, MALIK ABONGO OBAMA

*FIG. 5.*

HENRY VIII OF ENGLAND

HENRY VIII (28 JUNE 1491 – 28 JANUARY 1547) WAS KING OF ENGLAND AND LORD OF IRELAND, LATER KING OF IRELAND AND CLAIMANT TO THE KINGDOM OF FRANCE, FROM 21 APRIL 1509 UNTIL HIS DEATH. HENRY WAS THE SECOND MONARCH OF THE HOUSE OF TUDOR, SUCCEEDING HIS FATHER, HENRY VII.

DEATH OF ARTHUR

IN 1502, HOWEVER, ARTHUR SUDDENLY DIED OF AN UNKNOWN DISEASE, PERHAPS TUBERCULOSIS, AND HENRY WAS THRUST INTO ALL THE DUTIES OF HIS LATE BROTHER, BECOMING PRINCE OF WALES. HENRY'S FATHER RENEWED HIS EFFORTS TO SEAL AN ALLIANCE BETWEEN ENGLAND AND SPAIN VIA MARRIAGE. IN PLACE OF THE DEAD ARTHUR, SPAIN WAS OFFERED HENRY IN MARRIAGE TO PRINCE ARTHUR'S WIDOW, CATHERINE OF ARAGON, THE YOUNGEST SURVIVING CHILD OF KING FERDINAND II OF ARAGON AND QUEEN ISABELLA I OF CASTILE.[4]

IN ORDER FOR THE NEW PRINCE OF WALES TO MARRY HIS BROTHER'S WIDOW, A DISPENSATION FROM THE POPE WAS NORMALLY REQUIRED TO OVERRULE THE IMPEDIMENT OF AFFINITY. CATHERINE SWORE THAT HER MARRIAGE TO PRINCE ARTHUR HAD BEEN UNCONSUMMATED; STILL, BOTH THE ENGLISH AND SPANISH PARTIES AGREED THAT AN ADDITIONAL PAPAL DISPENSATION OF AFFINITY WOULD BE PRUDENT TO REMOVE ALL DOUBT REGARDING THE LEGITIMACY OF THE MARRIAGE.

DUE TO THE IMPATIENCE OF CATHERINE'S MOTHER, QUEEN ISABELLA, THE POPE, JULIUS II, GRANTED HIS DISPENSATION IN THE FORM OF A PAPAL BULL. THUS, FOURTEEN MONTHS AFTER HER YOUNG HUSBAND'S DEATH, CATHERINE FOUND HERSELF BETROTHED TO HIS BROTHER, THE NEW PRINCE OF WALES. BY 1505, HOWEVER, HENRY VII LOST INTEREST IN AN ALLIANCE WITH SPAIN, AND THE YOUNGER HENRY DECLARED THAT HIS BETROTHAL HAD BEEN ARRANGED WITHOUT HIS CONSENT.

CONTINUED DIPLOMATIC MANEUVERING OVER THE FATE OF THE PROPOSED MARRIAGE LINGERED UNTIL THE DEATH OF HENRY VII IN 1509. ONLY 17 YEARS OLD, HENRY MARRIED HIS BROTHER'S WIDOW, CATHERINE, ON 11 JUNE 1509, AND ON 24 JUNE 1509, THE TWO WERE CROWNED AT WESTMINSTER ABBEY; TWO DAYS LATER, HE ARRESTED HIS FATHER'S TWO MOST UNPOPULAR MINISTERS, SIR RICHARD EMPSON AND EDMUND DUDLEY. THEY WERE GROUNDLESSLY CHARGED WITH HIGH TREASON AND IN 1510, THE KING HAD THEM EXECUTED. THIS WAS TO BECOME HENRY'S PRIMARY TACTIC FOR DEALING WITH THOSE WHO STOOD IN HIS WAY.[1]

*FIG. 6.*

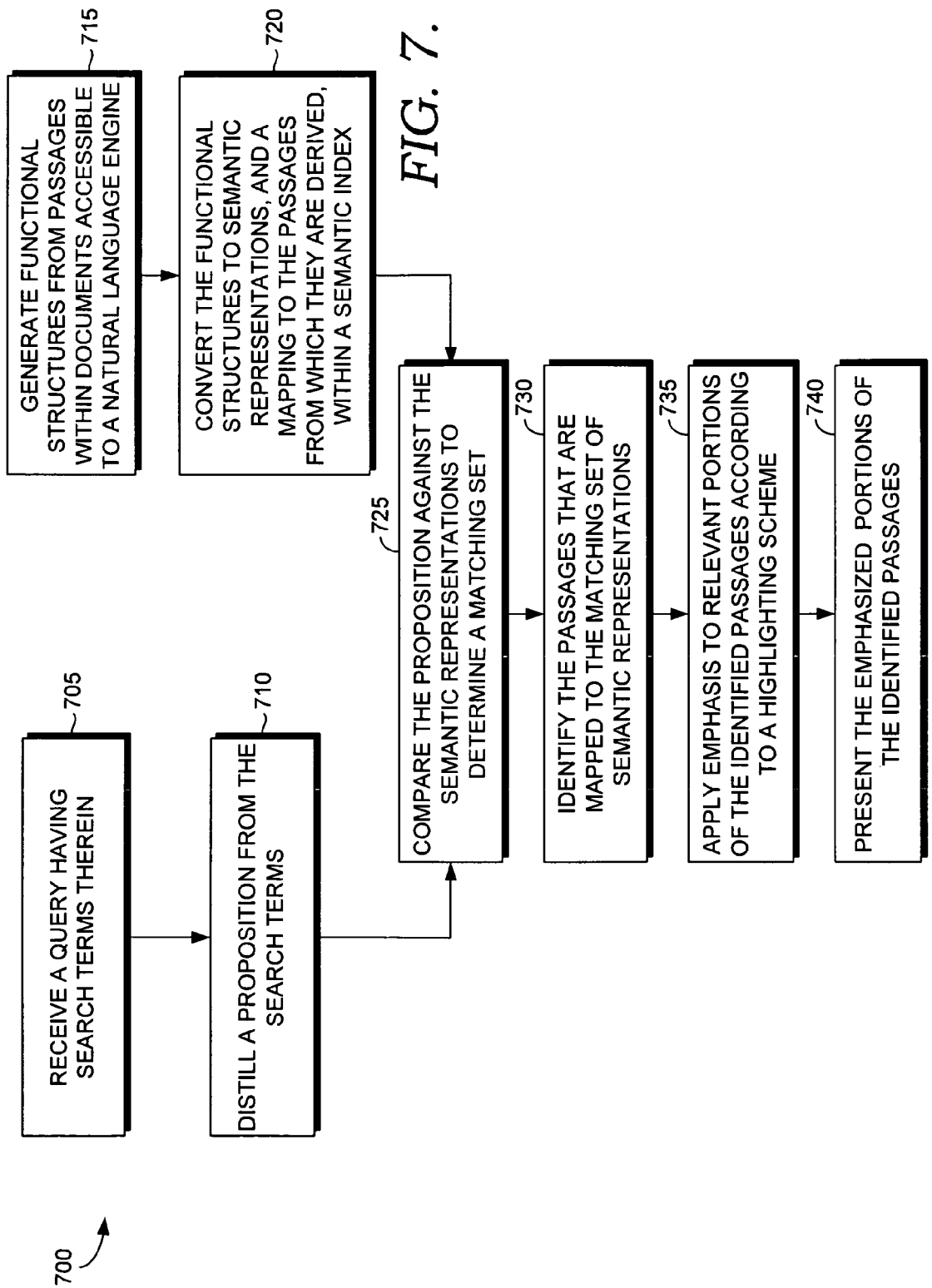

EMPHASIZING SEARCH RESULTS ACCORDING TO CONCEPTUAL MEANING

This non-provisional application claims the benefit of the following U.S. Provisional Applications having the respectively listed Application numbers and filing dates, and each of which is expressly incorporated by reference herein: U.S. Provisional Application No. 60/969,478, filed Aug. 31, 2007; and U.S. Provisional Application No. 60/969,486, filed Aug. 31, 2007.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Search engines have become an increasingly important tool for conducting research or navigating documents accessible via the Internet, items on hard disks within a personal computer, or even content residing on a mobile phone. Often, the search engines perform a matching process for detecting possible documents, or text within those documents, that corresponds with a query submitted by a user. Initially, the matching process, offered by conventional search engines, such as those maintained by Google or Yahoo, allow the user to specify one or more keywords in the query to describe information that s/he is looking for. Next, the conventional search engine proceeds to find all documents that contain exact matches of the keywords and typically presents a result for each document as a block of text that includes one or more of the keywords provided by the user therein.

Suppose, for example, that the user desired to discover which entity purchased the company PeopleSoft. Entering a query with the keywords "who bought PeopleSoft" to the conventional engine produces the following as one of its results: "J. Williams was an officer, who founded Vantive in the late 1990s, which was bought by PeopleSoft in 1999, which in turn was purchased by Oracle in 2005." In this result, the words from the retrieved text that exactly match the keywords "who," "bought," and "PeopleSoft," from the query, are bold-faced to give some justification to the user as to why this result is returned. While this result does contain the answer to the user's query (Oracle), there are no indications in the display to draw attention to that particular word as opposed to the other company, Vantive, that was also the target of an acquisition. Moreover, the bold-faced words draw a user's attention towards the word "who," which refers to J. Williams, thereby misdirecting the user to a person who did not buy PeopleSoft and who does not accurately satisfy the query. Accordingly, providing a matching process that promotes exact keyword matching is not efficient for the user and often more misleading than useful.

Present conventional search engines are limited in that they do not recognize words in the searched documents corresponding to keywords in the query beyond the exact matches produced by the matching process. In addition, the conventional search engines do not have the capability to recognize linguistic patterns within the query or the searched documents, as opposed to merely recognizing the actual words therein (e.g., failing to distinguish whether PeopleSoft is the agent of the Vantive acquisition or the target of the Oracle acquisition). Also, convention search engines are limited because a user is restricted to using keywords in a query that are to be matched, and thus, do not allow the user to express precisely the information desired in the search results. Accordingly, implementing a natural language search engine to recognize semantic relations between keywords of a query and words in searched documents, as well as techniques for highlighting these recognized words when being presented to a user as search results, would uniquely increase the accuracy of the search results and would advantageously direct the user's attention to text in the searched documents that is most responsive to the query.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media, a computerized method, and a computer system for employing a procedure to recognize and highlight words in searched documents corresponding to search terms, or keywords, in a query beyond the exact matches produced by the matching process. In particular, a natural language engine may be implemented to recognize semantic relations between the search terms of the query and content within the searched documents, and to employ techniques for highlighting these recognized words when being presented to a user as search results. Accordingly, the accuracy of the search results is increased and the highlighting advantageously directs the user's attention to text in the searched documents that is most responsive to the query. For instance, the search terms of the query may be written in a format that poses a question, while the highlighted portion of a search result, which is relevant to the query, may be formatted as an answer that satisfies the question.

When attempting to present search results that include highlighted regions that are relevant to a conceptual meaning of a query, several semantic-related processes are invoked. In one instance, a query conditioning pipeline is employed to derive a proposition from a query. Deriving a proposition is carried out by receiving and parsing search terms of the query, and distilling the proposition from the search terms, where the proposition is a logical representation of the conceptual meaning of the query. In another instance, an indexing pipeline is employed to derive semantic representations from at least one document. Deriving semantic representations is carried out by accessing content of the document, distilling linguistic representations from the content, and storing the linguistic representations within a semantic index as semantic representations. These semantic representations may be compared against the proposition to identify a matching set. Regions of content within the document, from which the matching set of semantic representations are derived, are targeted. Accordingly, highlighting may be applied to a sequence of words encompassed by the targeted regions. This highlighted sequence of words may be revealed to the user on a user interface (UI) display within a listing of the search results relevant to the query. In other embodiments, emphasis may be applied to the words, phrases, or characters encompassed by the targeted region such that the region is distinct from the balance of the search result when offered to the user (e.g., via video, audio, and physical feedback devices).

BRIEF DESCRIPTION OF THE DRAWINGS

The present invention is described in detail below with reference to the attached drawing figures, wherein:

FIGS. 4-6 are illustrative screen displays of exemplary user interfaces for presenting emphasized regions within search results, in accordance with an embodiment of the present invention; and FIG. 7 is a flow diagram illustrating an overall method for ascertaining and highlighting a region of content within a document that corresponds to a conceptual meaning of a query, in accordance with an embodiment of the present invention.

DETAILED DESCRIPTION

Figure 1:
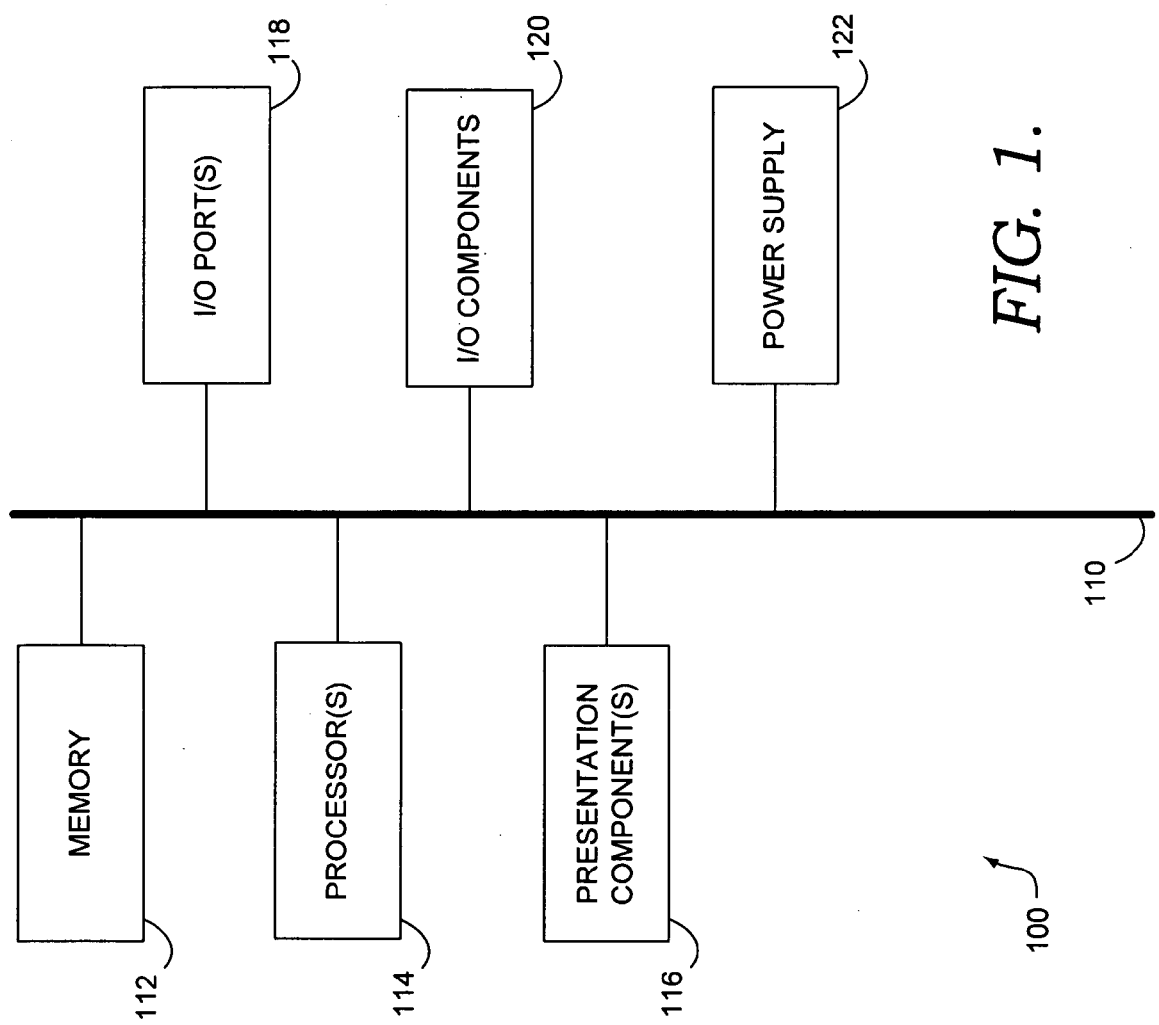
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates to one or more computer-readable media having computer-executable instructions embodied thereon that, when executed, perform a method for, in response to a query, presenting search results that have regions emphasized therein, in accordance with a highlighting scheme. The method generally includes receiving a query that contains one or more search terms, and distilling a proposition from the search terms. Typically, the proposition is a logical representation of a conceptual meaning of the query. The proposition may be compared against semantic representations retained in a semantic index to determine a matching set. Typically, the semantic representations include a linguistic representation derived from content of passages within at least one document. These identified passages are mapped to the matching set of semantic representations. In an exemplary embodiment, emphasis is applied to the regions of the identified passages according to a highlighting scheme, and the emphasized regions of the identified passages are presented to the user as the search results relevant to the query.

In another embodiment, aspects of the present invention employ a computerized method for presenting search results to a user having regions highlighted therein that are relevant to a conceptual meaning of a query. In one instance, the method includes employing a query conditioning pipeline to derive a proposition from a query. Typically, deriving the proposition involves receiving a query that has search terms therein, and distilling the proposition from the search terms. In general, the proposition is a logical representation of the conceptual meaning of the query. In another instance, the method includes employing an indexing pipeline to derive semantic representations from at least one document. Typically, deriving the semantic representations involves accessing the passages of content within the document via a network, distilling linguistic representations from the content of the passages, and storing the linguistic representations within a semantic index as semantic representations.

The proposition may be compared against the semantic representations held in the semantic index to determine a matching set. Passages of the document that are mapped to the matching set of semantic representations are identified. Regions of content within the identified passages, from which the matching set of semantic representations are derived, are selected. In an exemplary embodiment, highlighting is imposed on a sequence of words encompassed by the selected regions, such that the highlighted sequence of words may be revealed to the user on a user interface (UI) display within a listing of the search results relevant to the query. By way of example, imposing highlighting on the sequence of words includes imposing a first type of typographic technique to emphasize the sequence of words within the selected region, and imposing a second type of typographic technique to emphasize words that provide context for, or modify, the sequence of words.

In yet another embodiment, the present invention encompasses a computer system capable of emphasizing a region within a search result, upon matching a proposition derived from a query to a semantic representation derived from content within at least one document. In general, the computer system is configured to include a computer storage medium that has a plurality of computer software components embodied thereon. Initially, these computer software components include, but are not limited to, a query parsing component, a first semantic interpretation component, a document parsing component, a second semantic interpretation component, a semantic index, and a matching component. In embodiments, the query parsing component receives the query from a client device and identifies search terms that comprise the query. In addition, the query parsing component converts the query to a functional structure utilizing, in part, lexical functional grammar rules. The first semantic interpretation component derives the proposition from the functional structure of the query, based on a semantic relationship of the terms and/or utilizing ordered term-writing rules. As discussed above, the proposition is a logical representation of a conceptual meaning of the query.

The document parsing component inspects a data store, over a network or internally within a single device, in order to access the content of the document. Similar to the query parsing component, the document parsing component converts the content of the document to a functional structure utilizing, in part, lexical functional grammar rules. The second semantic interpretation component utilizes an ordered sequence of term-rewriting rules, or any other heuristics known in the relevant field, to derive the semantic representations from the functional structure. In one embodiment, the semantic index is an organization framework that stores the semantic representations in an inverted format, where the inverted format is searchable upon introducing the proposition to semantic index. Or, in another embodiment, the organized framework may be a flat list that is incrementally interrogated to find semantic representations that correspond with the proposition. Although two different configurations of the organizational framework have been described, it should be understood and appreciated by those of ordinary skill in the art that other types of suitable configurations of the semantic index that may be used, and that embodiments of the present invention are not limited to those described herein.

The matching component compares the proposition against the semantic representations, held in the semantic index, to determine a matching set. In addition, the semantic index identifies a region of content within the at least one document that is mapped to the matching set of semantic representations. Typically, the region of content is emphasized, with respect to other content of the search result, when presented to a user.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated to be within the scope of FIG. 1 in reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
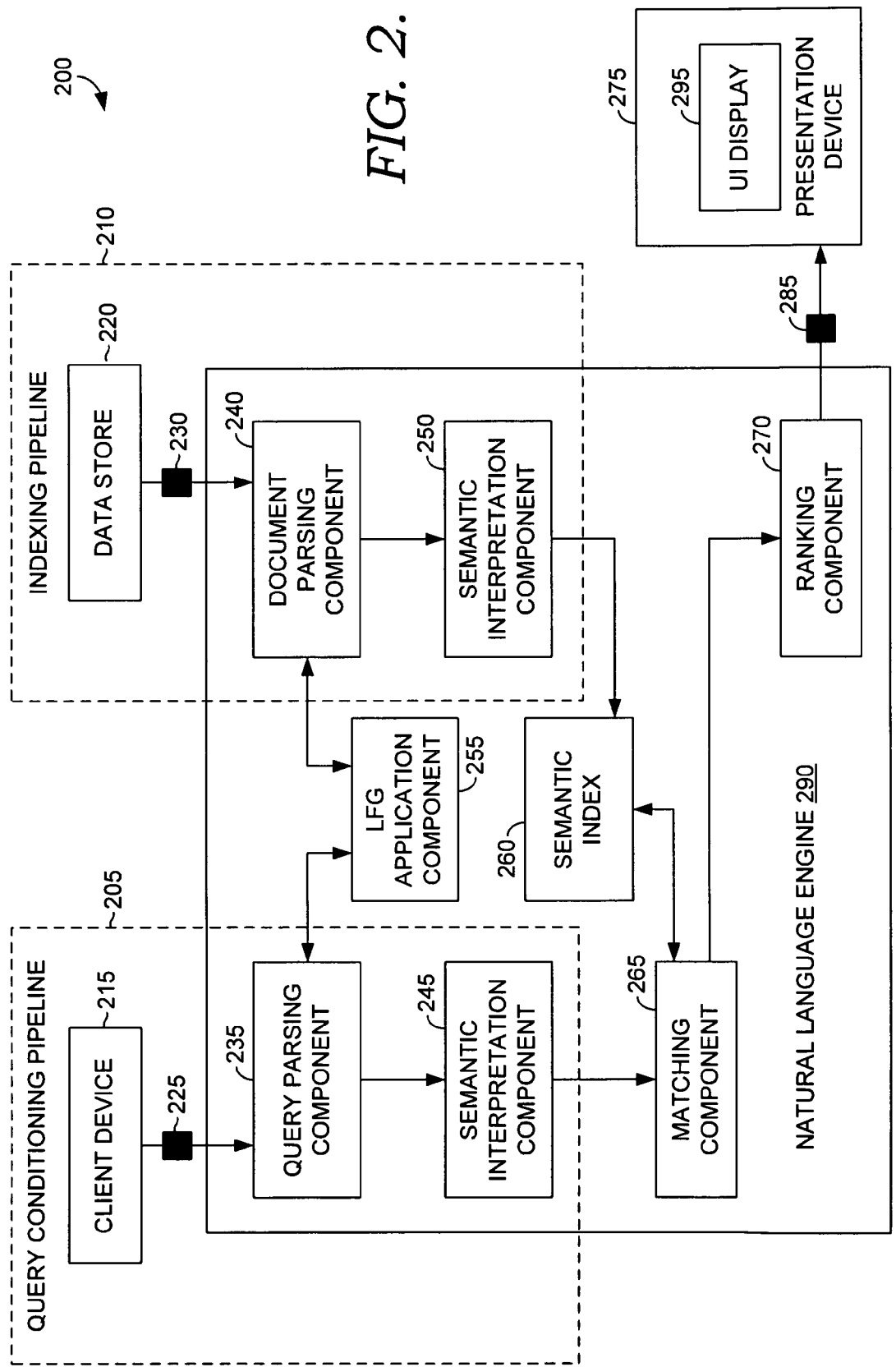
FIG. 2 is a schematic diagram of an exemplary overall system architecture suitable for use in implementing embodiments of the present invention.

Turning now to FIG. 2, a schematic diagram of an exemplary system architecture 200 suitable for use in implementing embodiments of the present invention is shown, in accordance with an embodiment of the present invention. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

As illustrated, the system architecture 200 may include a distributed computing environment, where a client device 215 is operably coupled to a natural language engine 290, which, in turn, is operably coupled to a data store 220. In embodiments of the present invention that are practiced in the distributed computing environments, the operable coupling refers to linking the client device 215 and the data store 220 to the natural language engine 290, and other online components through appropriate connections. These connections may be wired or wireless. Examples of particular wired embodiments, within the scope of the present invention, include USB connections and cable connections over a network (not shown), or a bus or other channel that interconnects components within a single machine. Examples of particular wireless embodiments, within the scope of the present invention, include a near-range wireless network and radio-frequency technology.

It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the client device 215, the data store 220 and the natural language engine 290, for instance, are not limited by the examples described, but embrace a wide variety of methods of communications. In another embodiment, the computing device may internally accommodate the functionality of the server 250, thereby alleviating dependence on wireless or wired connections.

Exemplary system architecture 200 includes the client device 215 for, in part, supporting operation of the presentation device 275. In an exemplary embodiment, where the client device 215 is a mobile device for instance, the presentation device (e.g., a touchscreen display) may be disposed on the client device 215. In addition, the client device 215 may take the form of various types of computing devices. By way of example only, the client device 215 may be a personal computing device (e.g., computing device 100 of FIG. 1), handheld device (e.g., personal digital assistant), a mobile device (e.g., laptop computer, cell phone, media player), consumer electronic device, various servers, and the like. Additionally, the computing device may comprise two or more electronic devices configured to share information therebetween.

In embodiments, as discussed above, the client device 215 includes, or is operably coupled to the presentation device 275, which is configured to present a UI display 295 on the presentation device 275. The presentation device 275 may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. Although several differing configurations of the presentation device 275 have been described above, it should be understood and appreciated by those of ordinary skill in the art that various types of presentation devices that present information may be employed as the presentation device 275, and that embodiments of the present invention are not limited to those presentation devices 275 that are shown and described.

In one exemplary embodiment, the UI display 295 rendered by the presentation device 275 is configured to present a web page (not shown) that is associated with natural language engine 290 and/or a content publisher. In embodiments, the web page may reveal a search-entry area that receives a query and search results that are discovered by searching the semantic index with the query. The query may be manually provided by a user at the search-entry area, or may be automatically generated by software. In addition, as more fully discussed below, the query may include one or more keywords that, when submitted, invokes the natural language engine 290 to identify appropriate search results that are most responsive to the keywords in a query.

The natural language engine 290, shown in FIG. 2, may take the form of various types of computing devices, such as, for example, the computing device 100 described above with reference to FIG. 1. By way of example only and not limitation, the natural language engine 290 may be a personal computer, desktop computer, laptop computer, consumer electronic device, handheld device (e.g., personal digital assistant), various remote servers (e.g., online server cloud), processing equipment, and the like. It should be noted, however, that the invention is not limited to implementation on such computing devices but may be implemented on any of a variety of different types of computing devices within the scope of embodiments of the present invention.

Further, in one instance, the natural language engine 290 is configured as a search engine designed for searching for information on the Internet and/or the data store 220, and for gathering search results from the information, within the scope of the search, in response to submission of the query via the client device 215. In one embodiment, the search engine includes one or more web crawlers that mine available data (e.g., newsgroups, databases, open directories, the data store 220, and the like) accessible via the Internet and build a semantic index 260 containing web addresses along with the subject matter of web pages or other documents stored in a meaningful format. In another embodiment, the search engine is operable to facilitate identifying and retrieving the search results (e.g., listing, table, ranked order of web addresses, and the like) from the semantic index that are relevant to search terms within the submitted query. The search engine may be accessed by Internet users through a web-browser application disposed on the client device 215. Accordingly, the users may conduct an Internet search by submitting search terms at the search-entry area (e.g., presented on the UI display 295 generated by the web-browser application associated with the search engine). In another configuration, a search may be conducted whereby a query is submitted to one or more system indexes in order to retrieve contents from a local information store, such as a user's hard-disk.

The data store 220 is generally configured to store information associated with online items and/or materials that have searchable content associated therewith (e.g., documents that comprise the Wikipedia website). In various embodiments, such information may include, without limitation, documents, content of a web page/site, electronic materials accessible via the Internet, a local intranet, or the memory or hard-disk of the user's machine, and other typical resources available to a search engine. In addition, the data store 220 may be configured to allow for suitable access of the stored information. In one instance, allowing for suitable access includes selecting or filtering a subset of the documents in the data store according to criteria supplied thereto.

For instance, the data store 220 may be searchable for one or more documents selected for processing by the natural language engine 290. In embodiments, the natural language engine 290 is allowed to freely inspect the data store for documents that have been recently added or amended in order to update the semantic index. The process of inspection may be carried out continuously, in predefined intervals, or upon an indication that a change has occurred to one or more documents aggregated at the data store 220. It will be understood and appreciated by those of ordinary skill in the art that the information stored in the data store 220 may be configurable and may include any information within a scope of an online search. The content and volume of such information are not intended to limit the scope of embodiments of the present invention in any way. Further, though illustrated as a single, independent component, the data store 220 may, in fact, be a plurality of databases, for instance, a database cluster, portions of which may reside on the client device 215, the natural language engine 290, another external computing device (not shown), and/or any combination thereof.

Generally, the natural language engine 290 provides a tool to assist users aspiring to explore and find information online. In embodiments, this tool operates by applying natural language processing technology to compute the meanings of passages in sets of documents, such as documents drawn from the data store 220. These meanings are stored in the semantic index 260 that is referenced upon executing a search. Initially, when a user enters a query into the search-entry area, a query search pipeline 205 analyzes the user's keywords (e.g., a character string, complete words, phrases, alphanumeric compositions, symbols, or questions) and translates the query into a structural representation utilizing semantic relationships. This representation, referred to hereinafter as a "proposition," may be utilized to interrogate information stored in the semantic index 260 to arrive upon relevant search results.

In one instance, the information stored in the semantic index 260 includes representations extracted from the documents maintained at the data store 220, or any other materials encompassed within the scope of an online search. This representation, referred to hereinafter as a "semantic representation," relates to the intuitive meaning of content distilled from common text and may be stored in the semantic index 260. In embodiments, the semantic representation is derived from a functional structure utilizing an ordered sequence of term-rewriting rules, or any other heuristics known in the relevant field. In embodiments, the "functional structure" is generated at an intermediate stage of an analysis pipeline by a document parsing component that converts the content of the document to the functional structure utilizing, in part, lexical functional grammar rules.

The architecture of the semantic index 260 allows for rapid comparison of the stored semantic representations against the derived propositions in order to find semantic representations that match the propositions and to retrieve documents mapped to the semantic representations that are relevant to the submitted query. Accordingly, the natural language engine 290 can determine the meaning of a user's query requirements from the keywords submitted into a search interface (e.g., the search-entry area presented on the UI display 295), and then to sift through a large amount of information to find corresponding search results that satisfy those needs.

In embodiments, the process above may be implemented by various functional elements that carry out one or more steps for discovering relevant search results. These functional elements include a query parsing component 235, a document parsing component 240, a semantic interpretation component 245, a semantic interpretation component 250, a lexical functional grammar (LFG) application component 255, the semantic index 260, a matching component 265, and a ranking component 270. These functional components 235, 240, 245, 250, 255, 260, 265, and 270 generally refer to individual modular software routines, and their associated hardware that are dynamically linked and ready to use with other components or devices.

Initially, the data store 220, the document parsing component 240, and the semantic interpretation component 250 comprise an indexing pipeline 210. In operation, the indexing pipeline 210 serves to distill the semantic representations from content within documents 230 accessed at the data store 220, and to construct the semantic index 260 upon gathering the semantic representations. As discussed above, when aggregated to form the semantic index 260, the semantic representations may retain a mapping to the documents 230, and/or location of content within the documents 230, from which they were derived. In other words, the semantic index 260 encodes the semantic representations (being derived from the functional structures created at the document parsing component 240) generated and conveyed by the semantic interpretation component 250. However, in other embodiments, the document parsing component 240 and semantic interpretation component 250 may be configured as a single element that does not divide the natural language processing into two stages (i.e., LFG parsing and semantic interpretation), but instead, produces semantic representations in a single step, without having a separate stage in which functional structures are produced.

Generally, the document parsing component 240 is configured to gather data that is available to the natural language engine 290. In one instance, gathering data includes inspecting the data store 220 to scan content of documents 230, or other information, stored therein. Because, the information within the data store 220 may be constantly updated, the process of gathering data may be executed at a regular interval, continuously, or upon notification that an update is made to one or more of the documents 230.

Upon gathering the content from the documents 230 and other available sources, the document parsing component 240 performs various procedures to prepare the content for semantic analysis thereof. These procedures may include text extraction, entity recognition, and parsing. The text extraction procedure substantially involves extracting tables, images, templates, and textual sections of data from the content of the documents 230 and to converting them from a raw online format to a usable format (e.g., HyperText Markup Language (HTML)), while saving links to documents 230 from which they are extracted in order to facilitate mapping. The usable format of the content may then be split up into sentences. In one instance, breaking content into sentences involves assembling a string of characters as an input, applying a set of rules to test the character string for specific properties, and, based on the specific properties, dividing the content into sentences. By way of example only, the specific properties of the content being tested may include punctuation and capitalization in order to determine the beginning and end of a sentence. Once a series of sentences is ascertained, each individual sentence is examined to detect words therein and to potentially recognize each word as an object (e.g., "The Hindenburg"), an event (e.g., "World War II"), a time (e.g., "September"), a verb, or any other category of word that may be utilized for promoting distinctions between words or for understanding the meaning of the subject sentence.

The entity recognition procedure assists in recognizing which words are names, as they provide specific answers to question-related keywords of a query (e.g., who, where, when). In embodiments, recognizing words includes identifying words as names and annotating the word with a tag to facilitate retrieval when interrogating the semantic index 260. In one instance, identifying words as names includes looking up the words in predefined lists of names to determine if there is a match. If no match exists, statistical information may be used to guess whether the word is a name. For example, statistical information may assist in recognizing a variation of a complex name, such as "USS Enterprise," which may have several common variations in spelling.

The parsing procedure, when implemented, provides insights into the structure of the sentences identified above. In one instance, these insights are provided by applying rules maintained in a framework of the LFG application component 255. When applied, these rules, or grammars, expedite analyzing the sentences to distill representations of the relationships among the words in the sentences. As discussed above, these representations are referred to as functional structures, and allow the semantic interpretation component 250 to capture critical information about the grammatical structure of the sentence (e.g., verb, subject, object, and the like).

The semantic interpretation component 250 is generally configured to diagnose the role of each word in the functional structure(s), generated by the document parsing component 240, by recognizing a semantic relationship between the words. Initially, diagnosing may include analyzing the grammatical organization of the functional structure and separating it into logical assertions that each express a discrete idea and particular facts. These logical assertions may be further analyzed to determine a function of each of a sequence of words that comprises the assertion. In one instance, determining the function of the sequence of words includes utilizing an ordered sequence of term-rewriting rules, or any other heuristics known in the relevant field.

If appropriate, based on the function or role of each word, one or more of the sequence of words may be expanded to include synonyms (i.e., linking to other words that correspond to the expanded word's specific meaning) or hypernyms (i.e., linking to other words that generally relate to the expanded word's general meaning). This expansion of the words, the function each word serves in an expression (discussed above), a grammatical relationship of each of the sequence of words, and any other information about the semantic representation, recognized by the semantic interpretation component 250, constitutes a semantic representation that may be stored at the semantic index 260 as a semantic representation.

The semantic index 260 serves to store the semantic representation derived by one or many components of the indexing pipeline 210 and may be configured in any manner known in the relevant field. By way of example, the semantic index may be configured as an inverted index that is structurally similar to conventional search engine indexes. In this exemplary embodiment, the inverted index is a rapidly searchable database whose entries are words with pointers to the documents 230, and locations therein, on which those words occur. Accordingly, when writing the semantic representations to the semantic index 260, each word and associated function is indexed along with the pointers to the sentences in documents in which the semantic word appeared. This framework of the semantic index 260 allows the matching component 265 to efficiently access, navigate, and match stored information to recover meaningful search results that correspond with the submitted query.

The client device 215, the query parsing component 235, and the semantic interpretation component 245 comprise a query conditioning pipeline 205. Similar to the indexing pipeline 210, the query conditioning pipeline 205 distills meaningful information from a sequence of words. However, in contrast to processing passages within documents 230, the query conditioning pipeline 205 processes keywords, phrases, or questions submitted within a query 225. For instance, the query parsing component 235 receives the query 225 and performs various procedures to prepare it for semantic analysis. These procedures may be similar to the procedures employed by the document parsing component 240 such as text extraction, entity recognition, and parsing. In addition, the structure of the query 225 may be identified by applying rules maintained in a framework of the LFG application component 255 and in the semantic interpretation component 245, thus, deriving a meaningful representation, or proposition, of the query 215.

In embodiments, the semantic interpretation component 245 may process the query semantic representation in a substantially comparable manner as the semantic interpretation component 250 interprets the functional structure derived from a passage of text in a document 230. In other embodiments, the semantic interpretation component 245 may identify a grammatical relationship of keywords within a string of keywords (e.g., a question or a phrase) that comprise the query 225. By way of example, identifying the grammatical relationship includes identifying whether a keyword functions as the subject (agent of an action), object, predicate, indirect object, or temporal location of the proposition of the query 255. In another instance, the proposition is processed to identify a role (e.g., agent or target of action) associated with each of the keywords of the query 225. By way of example, processing may include one or more of the following steps: determining a function of at least one of the keywords; identifying role(s) that correspond to the function; and associating the role(s) to the proposition derived from the query 225. Accordingly, this process expands the query 225 in a such a way as to broaden the scope of passages that may satisfy the query 225.

This proposition of the query 225, and the roles associated therewith, are then sent to the matching component 265 for comparison against the semantic representations extracted from the documents 230 and stored at the semantic index 260. In an exemplary embodiment, the matching component 265 compares the propositions of the queries 225 against the semantic representations at the semantic index 260 to ascertain matching semantic representations. In a specific instance of the embodiment, the matching semantic representations are discovered by ascertaining a group of semantic representations that satisfy one of the roles associated with the proposition, and selecting intersecting semantic representations from the group that satisfy each of the roles associated with the proposition.

These matching semantic representations may be mapped back to the documents 230 from which they were extracted by associating the documents 230, and the locations therein, from which the semantic representations were derived. These documents 230, targeted by the associated locations, are collected and sorted by the ranking component 270. Sorting may be performed in any known method within the relevant field, and may include without limitation, ranking according to closeness of match, listing based on popularity of the returned documents 230, or sorting based on attributes of the user submitting the query 225. These ranked documents 230 comprise the search result 285 and are conveyed to the presentation device 275 for surfacing in an appropriate format on the UI display 295.

With continued reference to FIG. 2, this exemplary system architecture 200 is but one example of a suitable environment that may be implemented to carry out aspects of the present invention and is not intended to suggest any limitation as to the scope of use or functionality of the invention. Neither should the illustrated exemplary system architecture 200, or the natural language engine 290, be interpreted as having any dependency or requirement relating to any one or combination of the components 235, 240, 245, 250, 255, 260, 265, and 270 as illustrated. In some embodiments, one or more of the components 235, 240, 245, 250, 255, 260, 265, and 270 may be implemented as stand-alone devices. In other embodiments, one or more of the components 235, 240, 245, 250, 255, 260, 265, and 270 may be integrated directly into the client device 215. It will be understood by those of ordinary skill in the art that the components 235, 240, 245, 250, 255, 260, 265, and 270 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one presentation device 275 is shown, many more may be communicatively coupled to the client device 215).

Figure 3:
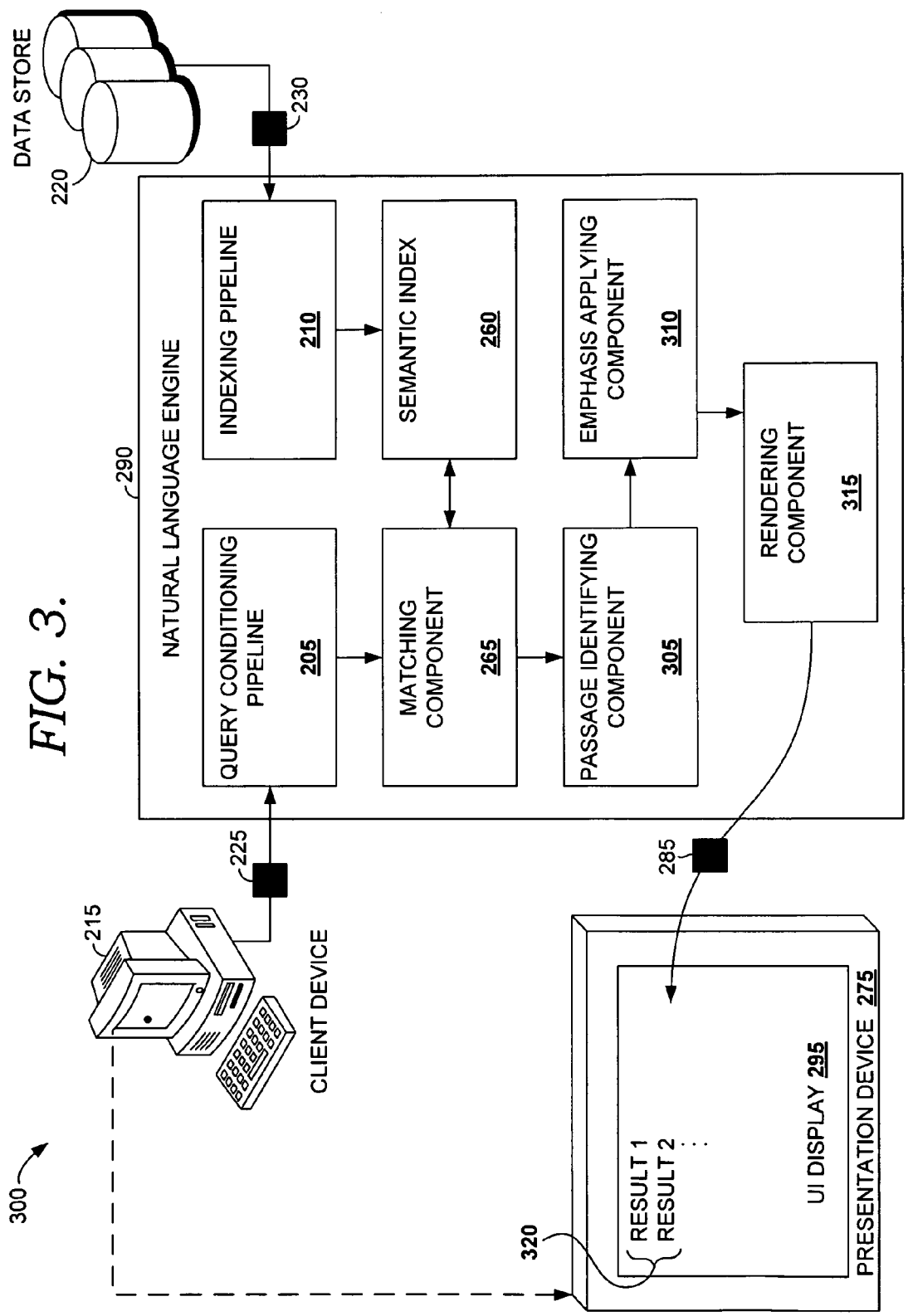
FIG. 3 is a schematic diagram of a subsystem within the exemplary system architecture, in accordance with an embodiment of the present invention.

Turning now to FIG. 3, a schematic diagram of a subsystem 300 within the exemplary system architecture is shown in accordance with an embodiment of the present invention. Initially, the subsystem comprises the client device 215, the data store 220, the natural language engine 290, and the presentation device 275, as more fully discussed above. In particular, the presentation device 275 includes the UI display 295 that is capable of presenting search results 320 or any other visible and/or auditory information to a user. For instance, the UI display 295 is configured to present any of the exemplary user interfaces depicted in FIGS. 4, 5, or 6, which are described below. Further, the client device 215, the data store 220, and the presentation device 275, may be communicatively coupled to the natural language engine 290 via a network (e.g., Internet or intranet), and are capable of conveying information across the network via near-range wireless technology or radio-frequency technology (as discussed above), or any other communicative technology practiced by those in the relevant field.

The natural language engine 290, shown in FIG. 3, may take the form of various types of computing devices that are capable of emphasizing a region within a search result that is selected upon matching the proposition derived from the query to the semantic representations derived from content within the documents 230 housed at the data store 220 or elsewhere (e.g., a storage location within the scope of, and accessible to, the natural language engine 290). Initially, these computer software components include the query conditioning pipeline 205, the indexing pipeline 210, the matching component 265, the semantic index 260, a passage identifying component 305, an emphasis applying component 310, and a rendering component 315. It should be noted that the natural language engine 290 of the subsystem 300 is but one example of a suitable environment that may be implemented to carry out aspects of the present invention and is not intended to suggest any limitation as to the scope of use or functionality of the invention. Neither should the illustrated natural language engine 290, of the subsystem 300, be interpreted as having any dependency or requirement relating to any one or combination of the components 205, 210, 260, 265, 305, 310, and 315 as illustrated. Accordingly, similar to the system architecture 200 of FIG. 2, any number of components may be employed to achieve the desired functionality within the scope of embodiments of the present invention.

In general, the query conditioning pipeline 205 is employed to derive a proposition from the query 225. In one instance, deriving the proposition includes receiving the query 225 that is comprised of search terms, and distilling the proposition from the search terms. Typically, as used herein, the term "proposition" refers to a logical representation of the conceptual meaning of the query 225. In instances, the proposition includes one or more logical elements that each represent a portion of the conceptual meaning of the query 225. Accordingly, the regions of content that are targeted and emphasized upon determining a match include words that correspond with one or more of the logical elements. As discussed above, with reference to FIG. 2, the query conditioning pipeline 205 encompasses the query parsing component 235, which receives the query 225 from a client device, and the first semantic interpretation component 245, which derives the proposition from the query 225 based, in part, on a semantic relationship of the search terms.

In embodiments, the indexing pipeline 220 is employed to derive semantic representations from at least one document 230 that resides at one or more local and/or remote locations (e.g., the data store 220). In one instance, deriving the semantic representations includes accessing the document 230 via a network, distilling linguistic representations from content of document, and storing the linguistic representations within a semantic index as the semantic representations. As discussed above, the document 230 may comprise any assortment of information, and may include various types of content, such as passages of text or character strings. Typically, as used herein, the phrase "semantic representation" refers to a linguistic representation of content, thereby capturing the conceptual meaning of a portion, or proposition, within the passage. In instances, the semantic representation includes one or more linguistic items that each perform a semantic role. "Semantic roles" may refer to a high-level purpose or category of sections of content, such as "agent" or "goal," as opposed to low-level grammatical functions, such as subject and object. For instance, this distinction may be demonstrating when contrasting passive and active sentences: John is the grammatical subject in "John saw Mary," but not in "Mary was seen by John," in which Mary is the subject. But, John is the "agent," or semantic subject, in both sentences.

Each of these linguistic items are derived from, and are mapped to, one or more words within the content of a particular document. Accordingly, mapping the semantic representation to words within the content allows for targeting these words, or "region," of the content upon ascertaining that the semantic representation matches the proposition. As discussed above, with reference to FIG. 2, the indexing pipeline 220 encompasses the document parsing component 240, which inspects the data store 220 to access content of at least one document 230 and to convert the content of the document to the functional structure utilizing, in part, lexical functional grammar (LFG) rules, and the semantic interpretation component 250 that utilizes an ordered sequence of term-rewriting rules, or any other heuristics known in the relevant field, to derive the semantic representations from the functional structures.

Although one implementation/algorithm for deriving the functional structure and converting the semantic representation therefrom has been described, it should be understood and appreciated by those of ordinary skill in the art that other types of suitable heuristics that distill semantic representation(s) from content may be used, and that embodiments of the present invention are not limited to tools for extracting semantic relationships between words, as described herein. By way of example, indexing pipeline 220 may encompass single stage element that converts the strings, text, passages, or other content into the semantic representations, without a separate LFG parsing, or any other kind of parsing, to create an intermediate level item (e.g., functional structure).

As discussed above, the matching component 265 is generally configured for comparing the proposition against the semantic representations held in the semantic index 260 to determine a matching set. In a particular instance, comparing the proposition and the semantic representation includes attempting to align the logical elements of the proposition with the linguistic items of the semantic representation to ascertain which semantic representations best correspond with the proposition. As such, there may exist differing levels of correspondence between semantic representations that are deemed to match the proposition. When employing the highlighting scheme, various typographic techniques may be applied in accordance with differing levels of correspondence between the logical elements of the proposition and the linguistic items of the semantic representations. By way of example, if regions of the search results 285 that are mapped to semantic representations, or the linguistic items therein, have a high level of correspondence to the proposition, then the regions may be emphasized by applying a first type of highlighting applied thereto. Meanwhile, if regions of the search results 285 that are mapped to semantic representations, or the linguistic items therein, have a low level of correspondence to the proposition, the these regions may be emphasized by applying a second type of highlighting applied thereto.

The function of the semantic index 260 (i.e., store the semantic representations in an organized and searchable fashion), remains substantially similar between embodiments of the natural language engine 290 as illustrated in FIG. 2 and FIG. 3, and will not be further discussed.

The passage identifying component 305, is generally adapted to identify the passages that are mapped to the matching set of semantic representations. In addition, the passage identifying component 305 facilitates identifying a region of content within the document 230 that is mapped to the matching set of semantic representations. In embodiments, the matching set of semantic representations is derived from a mapped region of content. Consequently, the region of content may be emphasized (e.g., utilizing the emphasis applying component 310), with respect to other content of the search results 285, when presented to a user (e.g., utilizing the presentation device 275).

It should be understood and appreciated that the designation of "region" of content, as used herein, is not meant to be limiting, and should be interpreted broadly to include, but is not limited to, at least, one of the following grammatical elements: a contiguous sequence of words, a disconnected aggregation of words and/or characters residing in the identified passages, a proposition, a sentence, a single word, or a single alphanumeric character or symbol. In another example, the "passages" of the content, at which the regions are targeted, may comprise one or more sentences. And, the regions may comprise a sequence of words that is detected by way of mapping content to a matching semantic representation. As such, a procedure for detecting the region within the identified passage may include the steps of detecting a sequence of words within the identified passages that are associated with the matching set of semantic representations, and, at least temporarily, storing the detected sequence of words as the region.

Further, in embodiments, the words in the content of the document 230 that are adjacent to the region may make up the balance of a body of the search result 285. Accordingly, the words adjacent to the region may comprise at least one of a sentence, a phrase, a paragraph, a snippet of the document 230, or one or more of the identified passages. By way of example, with reference to FIG. 4, a sentence of words adjacent to region 430, extracted verbatim from the content, is incorporated into the body of search result 425. In an exemplary embodiment, the words adjacent to the region 430 are selected for inclusion into the search results 420, of FIG. 4, based on their relevance to the query 225.

In one embodiment, the passage identifying component 305 employs a process to identify passages that are mapped to the matching set of semantic representations. Initially, the process includes ascertaining a location of the content from which the semantic representations are derived within the passages of the document 230. The location within the passages from which the semantic representations are derived may be expressed as character positions within the passages, byte positions within the passages, Cartesianal coordinates of the document 230, character string measurements, or any other means for locating characters/words/phrases within a 2-dimensional space. In one embodiment, the step of identifying passages that are mapped to the matching set of semantic representations includes ascertaining a location within the passages from which the semantic representations are derived, and appending a pointer to the semantic representations that indicates the locations within the passages. As such, the pointer, when recognized, facilitates navigation to an appropriate character string of the content for inclusion into an emphasized region of the search result(s) 285.

Next, the process may include writing the location of the content, and perhaps the semantic representations derived therefrom, to the semantic index 260. Then, upon comparing the proposition against function structures retained in the semantic index 260 (utilizing the matching component 265), the semantic index 260 may be inspected to determine the location of the content associated with the matching set of semantic representations. Further, in embodiments, the passages within the content of document may be navigated to discover the targeted location, or region, of the content. This targeted location is identified as the relevant portion of the content that is responsive to the query 225, and is earmarked for highlighting.

The emphasis applying component 310 is generally configured for imposing highlighting on a sequence of words encompassed by the regions, while the rendering component 315 is employed to reveal the highlighted sequence of words to the user, for example, on the UI display 295 within a listing of the search results 320 relevant to the query 225. At times, these components 310 and 315 function in cooperation to applying highlighting to the search results 285. Other times, the component 310 and 315 operate independently (e.g., submitting a highlighted region to cache prior to incorporation into the search results 285). Many aspects of the combined and separate operation of the components 310 and 315 are discussed more fully below with reference to the illustrative screen displays 400, 500, and 600 of FIGS. 4-6, respectively.

With reference to FIG. 4, an illustrative screen display of an exemplary user interface (UI) 400 for presenting emphasized regions within search results 420 is shown, in accordance with an embodiment of the present invention. In this embodiment, the UI 400 is presented as a web page on the UI display. As illustrated, a first portion of the web page is populated with the listing of search results 420. In embodiments, a second portion of the web page may have a search-entry area 410 revealed therein. Typically, the search-entry area 410 is configured to receive a query. In this instance, the query is "who criticized obama."

The search results 420 are typically listed in a prioritized order based on their relevance to the query. However, the search results may be listed according to any ranking scheme utilized in the data-gathering industry. Further, regions mapped to the matched semantic representations may be emphasized when presented to the user. In one embodiment, the emphasized regions of the identified passages are presented to the user such that the regions are positioned within actual text of the identified passages as the text appears in the document from which the identified passages are extracted. By way of example, the search result 425 includes a full sentence of content extracted verbatim from a document. A region 430, targeted by mapping a matching semantic representation to the content, includes a sequence of words 435. In this instance, the sequence of words 435 is contiguous; however, in other instances, the sequence of words may be disconnected. Further, the sequence of words 435 included within the highlighted region 430 is emphasized in the form of an answer ("Clinton criticized Obama") that is relevant to, and satisfies, the query, which is in the form of a question ("who criticized obama"). In other instances, emphasized words may be judged as relevant, even though they don't comprise a direct answer to the query.

Further, the emphasized region 430 encompasses words that literally match at least one (e.g., "criticized" and "obama"), but not all ("who"), of the search terms included in the query. Further yet, the emphasized region encompasses words ("Clinton") that are absent from the search terms of the query. This is mainly due to the process by which regions are identified for highlighting. In contrast to conventional search engines that provide literal matches only, thus, offering irrelevant search results; the natural language engine 290 of FIGS. 2 and 3 compares the conceptual meanings of the query against the passages of the searched documents to arrive upon a relevant search result. The relevant search result 425, comprising the region 430 and the text adjacent thereto, includes emphasis on the sequence of words 435 in order to draw attention to the most relevant portion of the search result 430. Accordingly, the user may make a determination of the applicability of the search result 425 to the query. Also, the emphasis on the sequence of words 435 provides justification as to why the search result 425 is included in the search results 420.

With reference to search result 440, emphasis is applied to a region 445 of the identified passages according to a highlighting scheme. In one instance, the highlighting scheme calls for employing typographic techniques to differentiate words within the region 450 from surrounding words within the identified passage. In general, employing the highlighting scheme includes imposing at least one of the following typographic techniques to emphasize the region 445: bold font; italicized font; underlining; textual coloring; or conventional highlighting. Although not mentioned, additional conventional typographic techniques may be applied to the region 445.

In another embodiment, with continued reference to search result 440, employing the highlighting scheme includes imposing a first type of typographic technique to emphasize a sequence of words 450 within the region 445. As illustrated, the sequence of words 450 includes "author . . . columnist . . . criticized obama." Accordingly, the sequence of words 450, encompassed by the region 445, offers a direct and relevant response to the question posed by the query. Also, employing the highlighting scheme may include imposing a second type of typographic technique to emphasize words 455 that provide context for, or modify, the sequence of words 450 within the region 445. As illustrated the words 455 that are included in the search result 440, and possibly adjacent to the sequence of words 450, include "Ann Coulter" and "heavily," and provide context for, or modify, the sequence of words 450. By way of example, a first type of typographic technique to emphasize a sequence of words 450 may include applying a dark highlighting to the sequence of words 450, while the second type of typographic technique to emphasize words 455 may include applying a light highlighting to the words 455.

Although two different typographic techniques for applying highlighting have been described, it should be understood and appreciated by those of ordinary skill in the art that other types of suitable highlighting may be imposed on one or any number of characters/words/phrases within the body of a search result, and that embodiments of the present invention are not limited to those methods of highlighting described herein. Further, the sequence of words may be emphasized without the use of a typographic technique. For instance, a sequence of words within a region that is targeted for emphasis may be distinguished from the balance of the search result utilizing audio, tactile, etc., feedback.

Turning to FIG. 5, an illustrative screen display of exemplary user interface 500 for presenting emphasized regions within search results 520 is shown, in accordance with an embodiment of the present invention. This user interface 500 is utilized primary to demonstrate the operation and effectiveness of the natural language engine. In this illustrative screen display, the query submitted to the search-entry area 410 includes the search terms "who did obama criticize." This query substantially shares three search terms with the query ("who criticized obama") of the user interface display 400 of FIG. 4. A conventional search engine might offer similar search results for each of these queries. But, the natural language engine is capable of deriving a logical representation of a conceptual meaning from the query (i.e., proposition), and matching that to an appropriate linguistic representation of content (i.e., semantic representation). Accordingly, the search results 520 satisfy the query of FIG. 5, while the search results 420 satisfy the query of FIG. 4, but the search results 530 and 420 are dramatically distinct. That is, a top search result 525 of the search results 520 (see FIG. 5) includes a sequence of words 535 "Obama . . . denounced Wright" within a highlighted region 530, while the top search result 425 of the search results 420 (see FIG. 4) includes the different sequence of words "Clinton criticized Obama." As such, each of the sequence of words satisfies its respective query, as opposed to simply matching search terms within the query.

With reference to FIG. 6, an illustrative screen display of an exemplary user interface 600 for presenting emphasized regions within search results is shown, in accordance with an embodiment of the present invention. In this UI 600, the search-entry area 410 allows for navigating to a particular document 620 within a database (e.g., Wikipedia®), while a second search-entry box 610 is provided for exploring within the particular document 620. A query entered to the second search-entry box 610 is "who did he marry." The passages of the document 620 that satisfy the query illustrate that an exact match is not required. That is, "he" in the context of the document 620 (i.e., the Henry VIII article) is resolved to match against "Henry." Further, the passages that satisfy queries submitted to the search-entry box 610 are highlighted according to the procedure, implemented by the natural language engine, as discussed above. Further, various types of highlighting, or emphasis, may be imposed on regions and passages identified within the content of the document 620. For instance, an entire passage 625 may be underlined, thereby drawing a user's attention to the complete context of the result. In another instance, a first typographic technique may be applied to a sequence of words 635 within the passage 625, a second typographic technique may be applied to words 630 that modify the sequence of words 635 within the passage 625, a third typographic technique may be applied to words 640 that literally match the query, while the format of links 660 is preserved.

Turning now to FIG. 7, a flow diagram is illustrated that shows an overall method for ascertaining and highlighting a region of content within a document that corresponds to a conceptual meaning of a query, in accordance with an embodiment of the present invention. Initially, a query that includes one or more search terms therein is received from a client device at a natural language engine, as depicted at block 705. As depicted at block 710, a proposition may be derived from the search terms. As discussed above, the proposition is generally a logical representation of a conceptual meaning of the query. As depicted at block 715, semantic representations are generated from passages/content within documents accessible to the natural language engine. As discussed above, the semantic representations are generally linguistic representations derived from content of passages within one or more documents. As depicted at block 720, the semantic representations, and a mapping to the passages from which they are derived, are maintained within a semantic index.

As depicted at block 725, the proposition is compared against the semantic representations retained in the semantic index to determine a matching set. The passages that are mapped to the matching set of semantic representations are identified, as depicted at block 730. Emphasis may be applied to the regions of the identified passages according to a highlighting scheme (see block 735), and the emphasized regions of the identified passages may be presented to the user as the search results relevant to the query (see block 740). Accordingly, the present invention offers relevant search results that include an emphasized region that corresponds with the true objective of the query.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable media having computer-executable instructions embodied thereon that, when executed, perform a method for, in response to a query, presenting search results to a user having regions emphasized therein in accordance with a highlighting scheme, the method comprising:
   receiving a query having one or more search terms therein;
   determining a low-level grammatical function served by the one or more search terms within the query by analyzing a semantic relationship between the one or more search terms;
   identifying at least one role that corresponds to the determined function, wherein the at least one role represents a high-level purpose of the one or more search terms that is derived from the low-level grammatical function;
   distilling a proposition from the one or more search terms, wherein the proposition represents a logical meaning of content within the query
   comparing the at least one identified role and the proposition against semantic representations retained in a semantic index to determine a matching set, wherein the semantic representations comprise a linguistic representation derived from content of passages within at least one document, wherein determining the matching set comprises:
     (a) identifying a group of the semantic representations that correspond with the at least one identified role; and
     (b) selecting from the group the semantic representations that correspond with the proposition;
   identifying the passages that are mapped to the matching set of semantic representations;
   applying emphasis to the regions of the identified passages according to a highlighting scheme; and
   presenting the emphasized regions of the identified passages to the user as the search results relevant to the query.

2. The one or more computer-readable media of claim 1, wherein the proposition comprises one or more logical elements that each represent a portion of the conceptual meaning of the query, wherein the emphasized regions comprise words that correspond with the one or more logical elements.

3. The one or more computer-readable media of claim 1, wherein the semantic representations comprises one or more linguistic items that each perform a semantic function, wherein the emphasized regions comprise words that correspond with the one or more items.

4. The one or more computer-readable media of claim 1, wherein presenting the emphasized regions of the identified passages to the user comprises emphasizing words within actual text of the identified passages as the text appears in the at least one document from which the identified passages are extracted.

5. The one or more computer-readable media of claim 1, wherein presenting the emphasized regions of the identified passages to the user comprises:
   populating a listing of the search results with the identified passages that are mapped to the matching set of semantic representations; and
   presenting the listing of search results, and the emphasis applied to the regions of the identified passages therein, at a user interface (UI) display.

6. The one or more computer-readable media of claim 5, wherein presenting the emphasized regions of the identified passages to the user further comprises:
   surfacing a web page on the UI display;
   populating the listing of search results with a first portion of the web page; and
   inserting a search-entry area within a second portion of the web page, wherein the search-entry area is configured to receive the query.

7. The one or more computer-readable media of claim 1, wherein applying emphasis to the regions the identified passages according to a highlighting scheme comprises employing typographic techniques to differentiate words within the region from surrounding words within the identified passages.

8. The one or more computer-readable media of claim 7, further comprising employing the highlighting scheme by imposing at least one of the following typographic techniques to emphasize the region: bold font; italicized font; underlining; textual coloring; or conventional highlighting.

9. The one or more computer-readable media of claim 8, wherein employing the highlighting scheme by imposing typographic techniques comprises applying various typographic techniques in accordance with differing levels of correspondence between one or more logical elements of the proposition and one or more linguistic items of the semantic representations.

10. The one or more computer-readable media of claim 8, wherein employing the highlighting scheme comprises:
   imposing a first type of typographic technique to emphasize a sequence of words within the region; and
   imposing a second type of typographic technique to emphasize words that provide context for, or modify, the sequence of words within the region.

11. The one or more computer-readable media of claim 1, wherein identifying passages that are mapped to the matching set of semantic representations comprises:
  ascertaining a location of the content, from which the semantic representations are derived, within the passages of the at least one document;
  writing the location of the content, as well as the semantic representations derived therefrom, to the semantic index;
  upon comparing the proposition against semantic representations retained in a semantic index, inspecting the semantic index to determine the location of the content associated with the matching set of semantic representations; and
  navigating to the passages within the content of the at least one document as targeted by the location.

12. The one or more computer-readable media of claim 11, wherein identifying passages that are mapped to the matching set of semantic representations further comprises:
  ascertaining a location within the passages of the at least one document from which the semantic representations are derived; and
  appending a pointer to the semantic representations that indicates the locations within the passages, thereby facilitating navigation to an appropriate character string for inclusion in the emphasized region.

13. The one or more computer-readable media of claim 12, wherein the location within the passages of the at least one document from which the semantic representations are derived comprises at least one of character positions or byte positions within the passages.

14. The one or more computer-readable media of claim 1, further comprising selecting the region within the identified passage to which emphasis is applied, wherein selecting comprises:
  detecting a sequence of words within the identified passages that are associated with the matching set of semantic representations; and
  at least temporarily, storing the detected sequence of words as the region.

15. The one or more computer-readable media of claim 14, wherein the passages comprise sentences, and wherein the detected sequence of words comprises at least one of a phrase, one or more terms, or a sentence.

16. The one or more computer-readable media of claim 1, wherein the region comprises at least one of a contiguous sequence of words or a disconnected aggregation of words residing in the identified passages, wherein the region and words adjacent thereto comprise each of the search results, wherein the words adjacent to the region comprise at least one of a sentence, a phrase, a paragraph, a snippet of the at least one document, or one or more of the identified passages, and wherein the words adjacent to the regions are selected for inclusion into the search results based on their relevance to the query.

17. The one or more computer-readable media of claim 1, wherein applying emphasis to the regions of the identified passages according to a highlighting scheme comprises augmenting the regions by appending additional notation to the identified passages, and wherein the additional notation provides information that is absent from the region and satisfies the query.

18. A computerized method for presenting search results to a user having regions highlighted therein that are relevant to a conceptual meaning of a query, the method comprising:
  employing a query conditioning pipeline to derive a proposition from a query, wherein deriving comprises:
    (a) receiving a query having search terms therein;
    (b) determining a low-level grammatical function served by the one or more search terms within the query by analyzing a semantic relationship between the one or more search terms;
    (c) identifying at least one role that corresponds to the determined function, wherein the at least one role represents a high-level purpose of the one or more search terms that is derived from the low-level grammatical function; and
    (d) distilling a proposition from the one or more search terms, wherein the proposition represents a logical meaning of content within the query;
  employing an indexing pipeline to derive semantic representations from at least one document, wherein deriving comprises:
    (a) accessing the at least one document, wherein the document comprises passages of content;
    (b) parsing functional structures from the content of the passages; and
    (c) converting the functional structures to the semantic representations for storage within a semantic index;
  comparing the proposition and the at least one role against the semantic representations held in the semantic index to determine a matching set;
  identifying the passages that are mapped to the matching set of semantic representations;
  selecting regions of content within the identified passages from which the matching set of semantic representations are derived;
  imposing highlighting on a sequence of words encompassed by the regions; and
  revealing the highlighted sequence of words to the user on a user interface (UI) display within a listing of the search results relevant to the query.

19. The method of claim 18, wherein imposing highlighting on the sequence of words comprises:
  imposing a first type of typographic technique to emphasize the sequence of words within the region, wherein the emphasized region encompasses words that literally match at least one, but not all, of the search terms included in the query, and wherein the emphasized region encompasses words that are absent from the search terms of the query; and
  imposing a second type of typographic technique to emphasize words that provide context for, or modify, the sequence of words within the region.

20. A computer system capable of emphasizing a region within a search result, the computer system comprising a processing unit coupled to a computer storage medium, the computer storage medium having stored thereon a plurality of computer software components executable by the processing unit, the computer software components comprising:
  a query parsing component that receives a query, that has search terms therein, from a client device;
  a first semantic interpretation component that derives a proposition from the query based on a semantic relationship of the search terms, wherein the proposition is a logical representation of a conceptual meaning of the query, wherein deriving comprises;
    (a) determining a low-level grammatical function served by the one or more search terms within the query by analyzing a semantic relationship between the one or more search terms;

(b) identifying at least one role that corresponds to the determined function, wherein the at least one role represents a high-level purpose of the one or more search terms that is derived from the low-level grammatical function; and
(c) distilling a proposition from the one or more search terms, wherein the proposition represents a logical meaning of content within the query;

a document parsing component that inspects a data store to access the at least one document and the content therein and to apply lexical functional grammar rules to the content to derive a functional structure therefrom;

a second semantic interpretation component that converts the functional structure into the semantic representation;

a semantic index that stores the semantic representations; and a matching component that compares the proposition against the semantic representations held in the semantic index to determine a matching set, and identifies a region of content within the at least one document that is mapped to the matching set of semantic representations, wherein the region of content is emphasized, with respect to other content of the search result, when presented to a user.

\* \* \* \* \*